May 27, 1930. J. T. McGRATH 1,759,911
CORN TRIMMER
Filed Feb. 27, 1926
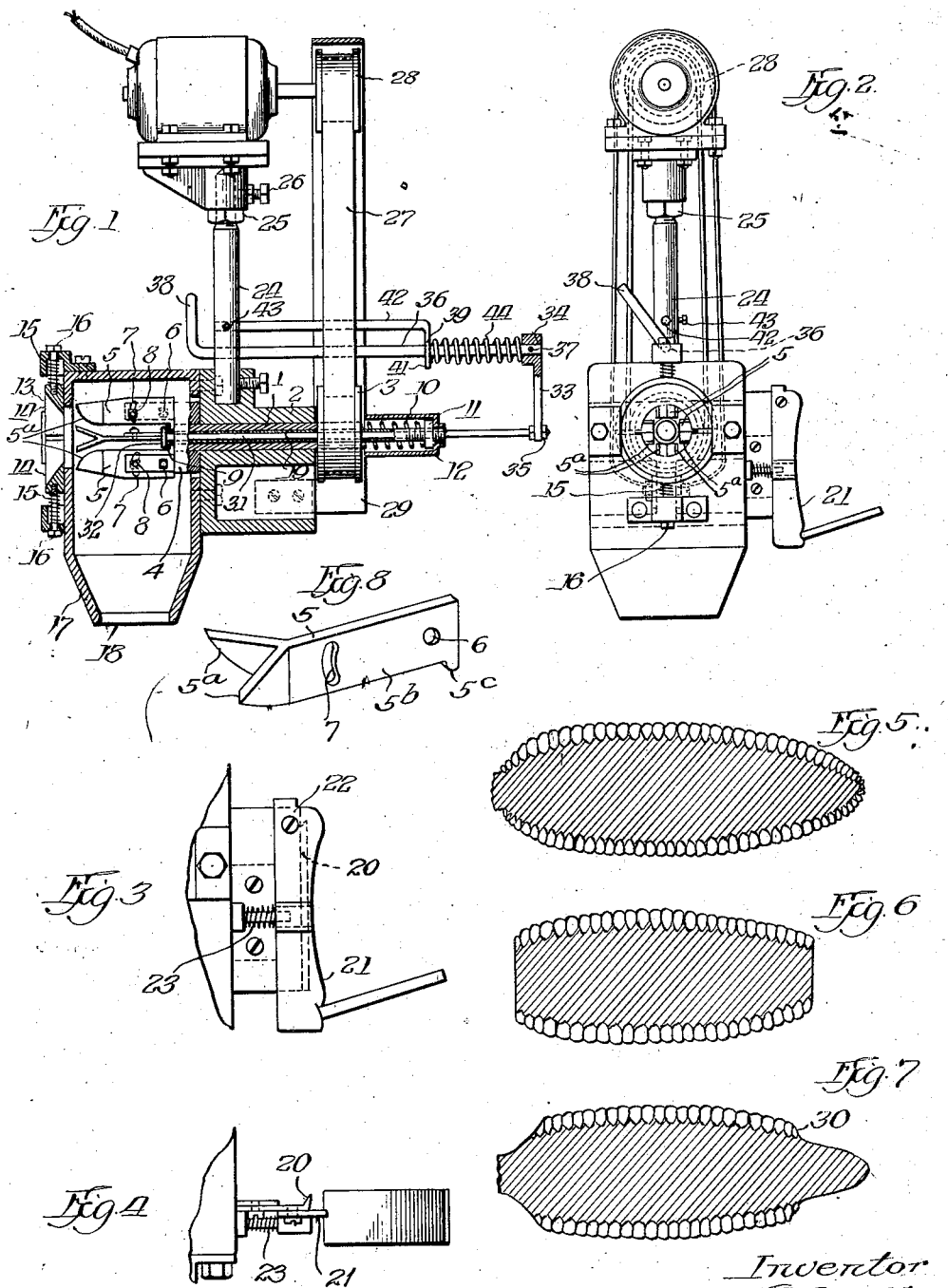
Inventor
John T. McGrath
By Ira J. Wilson
Atty
Witness:

Patented May 27, 1930

1,759,911

UNITED STATES PATENT OFFICE

JOHN THOMAS McGRATH, OF BLOOMINGTON, ILLINOIS

CORN TRIMMER

Application filed February 27, 1926. Serial No. 91,061.

This invention relates to a machine used in the corn canning industry for trimming off defective kernels from the ends of ears of corn. Hitherto a knife has been employed to chop off the ends of the cobs, but this method had the disadvantage of leaving a row of kernels at the end edge without lateral support and which invariably, fall into the mixture during the cutting operation as full grains, thus decreasing the output of fancy grade canned corn.

My invention not only removes the defective kernels, but also produces a fillet around the cob which furnishes a support to the last row of whole and perfect grains, preventing them from falling off when the final cutting operation begins.

Hence, this invention has two primary objects, one—removing defective kernels, and the other, to provide a supporting fillet for the end rows of whole kernels.

A further object is to provide a machine with self adjusting features which will lend themselves to high speed and economical production.

Another object of my invention is to provide knives which have double cutting blades, so that where, as in the drawings, four knives are used, eight blades are available for cutting the defective kernels from the cob, and thus in all cases, regardless of the number of knives used, there will be double the number of cutting blades.

A still further object of the invention is to provide means manually operated for ejecting broken ends of cobs from the revolving knives, so that the space between the knives may at all times be kept clean for the insertion of successive ears of corn.

Further objects and advantages of my invention will become apparent from an examination of the accompanying drawing which illustrates a preferred embodiment of my invention.

Fig. 1 is a side elevation, partly in section, of the corn trimmer, with the driving motor mounted as part of the unit, Fig. 2 is a front elevation of the same machine, Fig. 3 is a front elevation of the scraper, emphasizing the location of the guard thereon, Fig. 4 is a top view of said scraper and guard, Fig. 5 illustrates a typical ear in longitudinal cross section with defective kernels at both ends, Fig. 6 illustrates in longitudinal cross section the condition of a cob from which the defective kernels have been removed in accordance with the former practice of slicing both ends with a knife, Fig. 7 is an illustration in longitudinal cross-section of a typical ear after being trimmed by my machine, and Fig. 8 is a perspective view of the preferable form of knife with two cutting blades, and such as is shown assembled in Figs. 1 and 2.

Referring to Fig. 1, the rotatable shaft 1, mounted in a suitable bearing 2, driven by means of the pulley 3, carries on one of its ends a knife head 4 on which are mounted a plurality of pivotally secured knives 5 which may swing radially inwardly or outwardly about the pivots 6, guided in their movement by the guide slots 7 and the guide pins 8. These knives 5 are provided with a pair of cutting edges $5^a$ which diverge from the knife body $5^b$ in oblique directions, so that for each knife mounted as shown in Figs. 1 and 2, there will be a pair of cutting blades.

Fitting against the shoulders $5^c$ on the interior rear edges of the knives is the outwardly directed flange 9 of a sleeve or tube 19, and mounted on the other end of said tube is a compression spring 10 abutting the outward face of the pulley 3 and adjustably compressed by the nut 11. It will be observed that this spring and sleeve or tube are so arranged as to oppose the radial spreading of the several knives mounted on the knife head about pivots 6. This feature enables the knives to adjust themselves to the various sizes of ears presented for trimming. As a safety device, a cover 12 is placed about the spring 10.

An ear may be held centrally in a position for trimming by the self adjusting holder and guide, generally indicated as 13, in which movable plates 14 are subject to the pressure of compression springs 15. The studs 16 serve as guides for the springs 15, and for the plates 14, and are mounted preferably as illustrated. The receptacle indicated generally as 17 and the opening 18 serve to collect and discharge the turnings from the ears. This receptacle has an opening registering with the opening between the plates 14 through which the cob or ear is thrust and provides a safety device shielding the user from the knives 5.

Extending through the sleeve or tube 19 is an ejector rod 31 which has a head 32 at the front end of the same without said tube and contiguous with the outwardly curled flange 9, when in a normal position. This rod extends a considerable distance beyond the outer end of the cover 12 and is provided at the end thereof with a bracket 33 positioned and secured thereon by the nuts 35, and the upper end of said bracket has a hole 34 extending through the same for reception of an operating rod 36 which is fixedly secured therein by means of the set screw 37. This rod extends forward of the post 24, and is provided with an upturned portion 38 which serves as a handle for operating the ejector rod 31. The operating rod 36 passes through a hole 39 in the downwardly extending portion 41 of a support guide 42 which is secured in the post 24 by a setscrew 43. Between the upper end of the bracket 33 and the downwardly extending portion 41 of the support guide 42 and surrounding the operating rod 36 is a sprial spring 44 which is normally adapted to hold the said bracket 33 in its rearward position, and when the operating rod 36 is drawn forward by grasping the handle 38 thereof, the said spring is compressed and the ejector rod 31 is pushed forward in the tension tube 19 and the head 32 thereof will remove any broken ends of the cobs which may be adhering to the revolving knives.

Referring to Figs. 3 and 4, 20 is a knife designed for scraping bad portions from the side of the ears when the ears are drawn against this knife by hand. 21 is a safety guard movable pivotally on the pivot 22 and held in the safety position by the spring 23. In order to use this scraper, the operator pushes the guard back with the ear, and draws the ear along the knife edge.

This corn trimmer may be driven by an arrangement of gears or by a belt, but is shown in its preferable form as illustrated, carrying the electric motor mounted integrally with the corn trimmer. On the post 24, the nut 25 and the clamping screw 26 serve as a means for tightening the belt 27, which extends from the motor pulley 28, to the pulley 3. The motor used may be any one of various acceptable motors. Furthermore, a belt guard generally indicated 29 is provided.

Referring to Figs. 6 and 7, in which the novel feature of the invention is particularly illustrated, it will be noted that when the end of the ear of corn is cut squarely the grains adjacent thereto may readily fall off, taking with them the little hard portions by which they are attached to the cob. Grains of corn of this character lower the grade of cut corn and it is very desirable that such be prevented. The best time to prevent it, however, is before the corn is cut from the cob and I have found that if the corn be so cut at the ends that a fillet, such as that illustrated at 30, is produced, sufficient lateral support is given to the outside ring of whole kernels that they may be cut from the cob without carrying with them the little hard portions by which they are attached to the cob. Of course, it is unnecessary in many instances to cut off the end of the cob as well as the corn on such ends, but if it be desired to do so, it may be done, as will be obvious, but sufficient cob should be left to maintain the fillet 30 intact.

Having thus described my invention, and its objects, what I claim as new and desire to secure by Letters Patent, is:

1. In a corn trimming machine the combination of a rotatable head, a plurality of knives pivotally carried by said head so that the free ends thereof are capable of movement radially of the head, a longitudinally movable member connected with each knife, and a spring acting on said member to yieldably urge said knives into contracted position.

2. In a corn trimming machine, the combination of a rotatable head, a plurality of knives pivotally carried by said head so that the free ends thereof are capable of movement radially of the head, a longitudinally movable member connected with each knife, a spring acting on said member to yieldingly urge said knives into contracted position, and a rod extending through said movable member for ejecting particles adhering to the said knives.

3. In a corn trimming machine, the combination of a rotatable shaft provided with a head, a plurality of knives pivotally carried by said head, a tube extending longitudinally through said shaft and connected at one end with each of said knives, a spring operating upon said tube to yieldably retain said knives in contracted position, an ejector rod extending through said tube, a head on the forward end of said rod, and means for projecting said rod through said tube whereby said head ejects particles from the cutting edges of said knives.

4. In a corn trimmer, the combination of a rotatable shaft, a plurality of pivotally secured and radially opposed knives mounted thereon, and means including a resilient member disposed concentrically within said shaft for normally urging said knives in one direction radially.

5. In a corn trimming machine the combination of a hollow rotatable shaft, a knife carrying head mounted thereon, a plurality of knives pivoted on said head, means for yieldably opposing expansive movement of said knives so as to retain the same in operative position, and means operative through said hollow shaft for cleaning said knives.

6. In a corn trimming machine the combination of a rotatable shaft provided with a head, a plurality of knives carried by said head, a member extending substantially axially of said shaft and connected at one end with each of said knives, and resilient means connected with the other end of said member for yieldably retaining said knives in contracted position.

7. In a corn trimmer, the combination of means for removing the kernels from a circumferential marginal end of an ear of corn, said means including means for cutting a curved fillet between the whole grains and the surface of the ear remaining after the removal of grains from said marginal end, and means movable in proximity to said cutting means for disengaging from the cutting means any portions of ears which may adhere to the cutting means.

8. A corn trimmer comprising the combination of rotatable means for cutting kernels from an end portion of an ear of corn and for cutting a curved fillet in the kernels adjacent to the uncut remaining kernels, and self-adjusting means for centering and holding an ear in axial alignment with the cutting means.

9. In a corn trimmer, means for removing the kernels of an ear of corn from a portion of one end thereof including means for cutting a fillet between the portion from which the grains have been removed and the remaining grains adjacent thereto.

10. In a corn trimmer, a rotatable shaft, a knife secured to said shaft for rotation therewith and disposed with a portion of its blade substantially parallel the axis of rotation of said shaft and an outer end portion curving away from said shaft, means for guiding an ear of corn toward said blade with the axis of the ear substantially in alignment with the axis of said shaft and into engagement with both said portions of said blade, and means for rotating said shaft.

11. In a corn trimmer in combination, rotatably mounted means for cutting a circumferential taper and fillet on a corn ear, adjustable means for holding said ears with respect to said cutting means, and means for ejecting débris from said cutting means for cleaning the same.

12. In a device of the character described, a rotatable shaft, a plurality of knives each pivotally secured to said shaft adjacent one end thereof with their blades disposed substantially radially of the axis of the shaft and a portion of the blade cutting edge of each directed substantially radially inward, resilient means coaxial with said shaft normally tending to maintain said knives from moving radially outward from one another about their pivots, and means for rotating said shaft.

13. In a corn trimming device, a rotatable element, a plurality of knives secured to said element adjacent one end of each about a substantially common center and adapted to receive an end of an ear of corn between them, and means for ejecting débris lodging between said knives.

In witness of the foregoing I affix my signature.

JOHN THOMAS McGRATH.